Patented Oct. 10, 1939

2,175,963

UNITED STATES PATENT OFFICE 2,175,963

PRODUCTION OF MALE SEXUAL HORMONES

Ernst Laqueur, Karoly Gyula David, Elizabeth Dingemanse, and Janos Freud, Amsterdam, Netherlands, assignors, by mesne assignments, to Ciba Pharmaceutical Products, Incorporated, Summit, N. J.

No Drawing. Application January 25, 1937, Serial No. 122,324. Renewed January 6, 1939. In the Netherlands January 9, 1937

11 Claims. (Cl. 167—74)

This invention relates to a male sexual hormone and more especially to a composition of matter in a crystalline state, called testosterone, capable of affecting growth of the comb of capons and of certain reproductive organs of mammals. It has particular reference to a process of purifying the male sexual hormone and one of its objects is to provide means whereby this composition of matter can be produced in a crystalline state.

The present invention and the manner of operating it shall now be described more in detail.

The new process according to this invention consists therein that organs containing testosterone, for instance testicles, are extracted with organic solvents which are miscible with water. Preferably acetone is used in such a quantity that during the extraction a concentration of the acetone of 60% is maintained. Thereupon the organic solvent of the extract is removed, for instance by distillation and the remaining liquid is repeatedly extracted with a solvent immiscible with water, preferably benzene is used. A distribution of the extract between the two layers of a solvent mixture forming two phases may be inserted, for instance between 70% alcohol and petroleum ether. In case the solvent wherein the crude testosterone is dissolved is not indifferent to sulphuric acid it has to be replaced by such a solvent, for instance benzene. This solution is repeatedly extracted with 55%–75% sulphuric acid. The sulphuric acid layers are separated, diluted with water and extracted with an organic solvent. After evaporation of the solvent the residue is distilled in a high vacuum, whereby the fraction distilling between 110°–130° C. is separated. This fraction is recrystallized from organic solvents, preferably hexane and acetone until a constant melting point of 154.5° C. (corr.) is reached. This material consists of needles having the formula $C_{19}H_{28}O_2$. It has a specific rotation $$(\alpha)_D^{20} = +109°$$

(C=1 in abs. alcohol). Its maximum of absorption of ultraviolet light lies between 2.400 Å. Its structure is represented by the following formula:

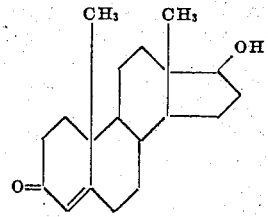

It forms an acetate having a melting point of 140–141° C. (corr.) and an oxime having a melting point of 222–223° C. (corr.). About 15γ of this material contain 1 capon unit, i. e., the effect of 100γ androsteron. We wish to be understood that the process of preparing this material is not limited to the exact details of the operations described, for obvious modifications will occur to persons skilled in the art.

In practising our invention we may for instance proceed as follows:

Example 1.—235 kg. testicles of bulls are extracted according to Gallagher and Koch (J. Biol. Chem. 84, 495, 1929) with alcohol, the alcohol is evaporated, the residual material is extracted with benzene, the benzene is evaporated and the residue extracted with acetone, the acetone solution is frozen, the precipitate is removed and after evaporation of the acetone the residue is distributed between a mixture of 70% alcohol and petroleum ether. From the alcohol layer which contains the main part of the testosterone, the solvent is evaporated, whereby 283 g. residue remain. The residue is dissolved in 3.6 lts. benzene and twice shaken with 600 cc. 60% sulphuric acid and once with 600 cc. of 70% sulphuric acid. The separated sulphuric acid layers are united and poured into 3.6 lts. ice water and four times extracted with 800 cc. ether. The ether solution is washed with 100 cc. 10% KOH and thereupon with distilled water until it has become neutral. It is dried with some sodium sulfate. After evaporation of the ether 345 mg. (=1.47 mg. per kg. testicles) residue remains, forming a viscous yellow-brown oil. A test of the physiological activity of this fraction shows that it contains 1 capon unit per 50γ, which means that 30 capon units per kg. testicles are obtained.

This oil is submitted to a fractionating high vacuum distillation at a pressure less than 0.001 mm. whereupon the fraction distilling between 110–130° C. is three times boiled with 20 cc. hexane. The united hexane solutions are concentrated by evaporation to a third of their volumes and kept at about 0° C. After several hours a yellow-white granular material separates, which is filtered off, washed with cold hexane and recrystallized several times from diluted acetone until white prismatic needles (M. P. 154–154.5° C. (corr.)) are obtained. Per kilogram testicles, 10 capon units are obtained as crystals.

Example 2.—250 kg. testicles of bulls are extracted with 250 ltr. of 98% acetone. The liquid is separated and the residue is extracted again, this time with 250 ltr. of 60% acetone. From the united extracts the acetone is evaporated and the remaining solution is extracted with 100 ltr. benzene. The benzene solution, which contains 280 gr. of solid matter, is submitted to the process described in Example 1 beginning with the treatment with sulphuric acid.

We claim:

1. The process of preparing purified testosterone, which comprises extracting a solution containing the same in an organic solvent, which is indifferent to sulphuric acid, with 55–75% sulphuric acid, diluting the sulphuric acid layer with water to a concentration not higher than 40% with regard to the sulphuric acid, extracting the solution with organic solvents immiscible with water, removing the organic solvents and subjecting the residue to distillation in a high vacuum and collecting the distillate.

2. The process of preparing purified testosterone, which comprises extracting a solution containing the same in benzene, extracting the solution with 55%–75% sulphuric acid, diluting the sulphuric acid layer with water to a concentration not higher than 40% with regard to the sulphuric acid, extracting the solution with organic solvents immiscible with water, removing the organic solvent and subjecting the residue to distillation in a high vacuum and collecting the distillate.

3. The process of preparing purified testosterone, which comprises extracting a solution containing the same in an organic solvent, which is indifferent to sulphuric acid, with 55%–75% sulphuric acid, diluting the sulphuric acid layer with water to a concentration not higher than 40% with regard to the sulphuric acid, extracting the solution with organic solvents immiscible with water, removing the organic solvent and subjecting the residue to distillation in a high vacuum and collecting the fraction distilling between 110°–130° C.

4. The process of preparing purified testosterone, which comprises extracting a solution containing the same in benzene, extracting the solution with 55%–75% sulphuric acid, diluting the sulphuric acid layer with water to a concentration not higher than 40% with regard to the sulphuric acid, extracting the solution with organic solvents immiscible with water, removing the organic solvent and subjecting the residue to distillation in a high vacuum and collecting the fraction distilling between 110°–130° C.

5. The process of preparing purified testosterone, which comprises extracting organs of mammals containing testosterone with organic solvents miscible with water, removing the organic solvent from the separated solution, extracting the remaining liquid with an organic solvent immiscible with water, distributing the extracted material between a mixture of 70% alcohol and petroleum ether, separating the alcohol layer, evaporating the alcohol thereof and dissolving the residue in an organic solvent, which is indifferent to sulphuric acid, extracting the solution with 60%–70% sulphuric acid, diluting the sulphuric acid layer with water to a concentration not higher than 40% with regard to the sulphuric acid, extracting the solution with organic solvents immiscible with water, removing the organic solvent and subjecting the residue to distillation in a high vacuum and collecting the distillate.

6. The process of preparing purified testosterone, which comprises extracting organs of mammals containing testosterone with so much acetone that in the extract a concentration of 60% acetone is obtained, removing the acetone from the separated solution, extracting the remaining liquid with an organic solvent immiscible with water and indifferent to sulphuric acid, extracting the solution with 55%–75% sulphuric acid, diluting the sulphuric acid layer with water to a concentration not higher than 40% with regard to sulphuric acid, extracting the solution with an organic solvent immiscible with water, removing the organic solvent and subjecting the residue to distillation in a high vacuum and collecting the distillate.

7. The process of preparing purified testosterone, which comprises extracting organs of mammals containing testosterone with organic solvents miscible with water, removing the organic solvent from the separated solution, extracting the remaining liquid with an organic solvent immiscible with water, distributing the extracted material between a mixture of 70% alcohol and petroleum ether, separating the alcohol layer, evaporating the alcohol thereof and dissolving the residue in an organic solvent, which is indifferent to sulphuric acid, extracting the solution with 55%–75% sulphuric acid, diluting the sulphuric acid layer with water to a concentration not higher than 40% with regard to the sulphuric acid, extracting the solution with organic solvents immiscible with water, removing the organic solvent and subjecting the residue to distillation in a high vacuum and collecting the fraction distilling between 110°–130° C.

8. The process of preparing purified testosterone which comprises extracting organs of mammals containing testosterone with so much acetone that in the extract of concentration of 60% acetone is obtained, removing the acetone from the separated solution, extracting the remaining liquid with an organic solvent immiscible with with water and indifferent to sulphuric acid, extracting the solution with 60%–70% sulphuric acid, diluting the sulphuric acid layer with water to a concentration not higher than 40% with regard to sulphuric acid, extracting the solution with an organic solvent immiscible with water, removing the organic solvent and subjecting the residue to distillation in a high vacuum and collecting the fraction distilling between 110°–130° C.

9. The process of preparing purified testosterone, which comprises extracting organs of mammals containing testosterone with organic solvents being miscible with water, removing the organic solvent from the separated solution, extracting the remaining liquid with an organic solvent being immiscible with water, distributing the extracted material between a mixture of 70% alcohol and petroleum ether, separating the alcohol layer, evaporating the alcohol thereof and dissolving the residue in an organic solvent, which is indifferent to sulphuric acid, extracting the solution with 55%–75% sulphuric acid, diluting the sulphuric acid layer with water to a concentration not higher than 40% with regard to the sulphuric acid, extracting the solution with organic solvents immiscible with water, removing the organic solvent and subjecting the residue to distillation in a high vacuum, collecting the distillate and recrystallizing it from organic solvents until crystals with a M. P. of 154–154.5° C. (corr.) are obtained.

10. The process of preparing purified testoterone which comprises extracting organs of mammals containing testosterone with organic solvents being miscible with water, removing the organic solvent from the separated solution, extracting the remaining liquid with an organic solvent being immiscible with water, distributing the extracted material between a mixture of 70% alcohol and petroleum ether, separating the alcohol layer, evaporating the alcohol thereof and dissolving the residue in an organic solvent, which is indifferent to sulphuric acid, extracting the solution with 55-75% sulphuric acid, diluting the sulphuric acid layer with water to a concentration not higher than 40% with regard to the sulphuric acid, extracting the solution with organic solvents immiscible with water, removing the organic solvent and subjecting the residue to distillation in a high vacuum, collecting the distillate, and recrystallizing it from hexane and thereupon from acetone until crystals with a m. p. of 154-154.5° C. (corr.) are obtained.

11. The process of preparing purified testosterone, which comprises extracting organs of mammals containing testosterone with so much acetone that in the extract a concentration of 60% acetone is obtained, removing the acetone from the separated solution, extracting the remaining liquid with an organic solvent being immiscible with water and indifferent to sulphuric acid, extracting the solution with 55%-75% sulphuric acid, diluting the sulphuric acid layer with water to a concenrtation not higher than 40% with regard to the sulphuric acid, extracting the solution with an organic solvent immiscible with water removing the organic solvent and subjecting the residue to distillation in a high vacuum, collecting the distillate and recrystallizing it from hexane and thereupon from acetone until crystals with a M. P. of 154-154.5° C. (corr.) are obtained.

ERNST LAQUEUR.
KAROLY GYULA DAVID.
ELIZABETH DINGEMANSE.
JANOS FREUD.